Sept. 15, 1925.
C. JACKSON
1,553,902
DISPLAY DEVICE
Filed Dec. 30, 1924
6 Sheets-Sheet 2
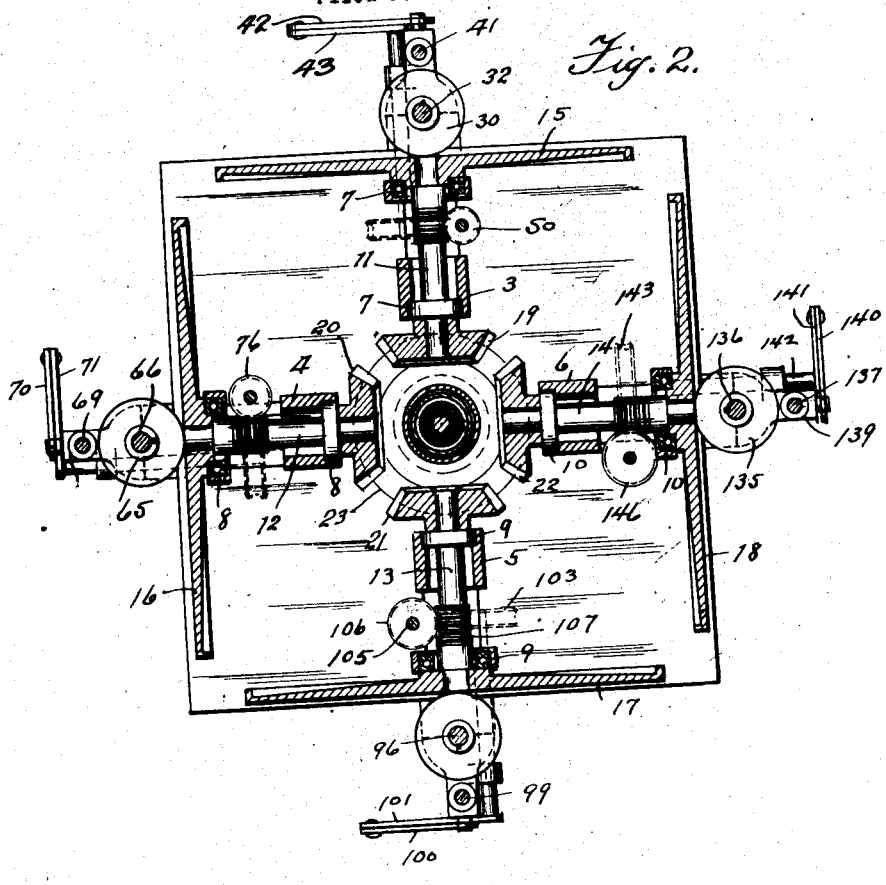
Fig. 2.
Calvin Jackson, Inventor
By, Attorney Sept. 15, 1925.

C. JACKSON 1,553,902

DISPLAY DEVICE

Filed Dec. 30, 1924

6 Sheets-Sheet 3

Calvin Jackson  Inventor

By  Attorney

Sept. 15, 1925.

C. JACKSON 1,553,902

DISPLAY DEVICE

Filed Dec. 30, 1924

6 Sheets-Sheet 4

Calvin Jackson, Inventor

By [signature], Attorney

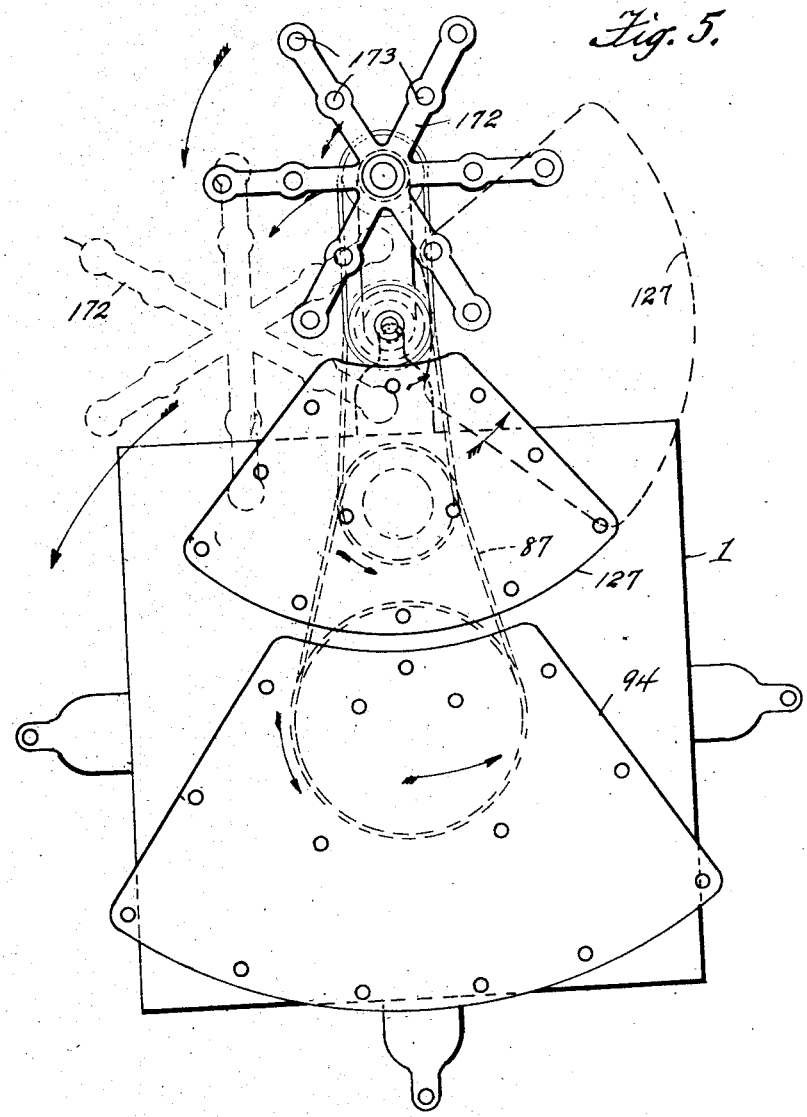

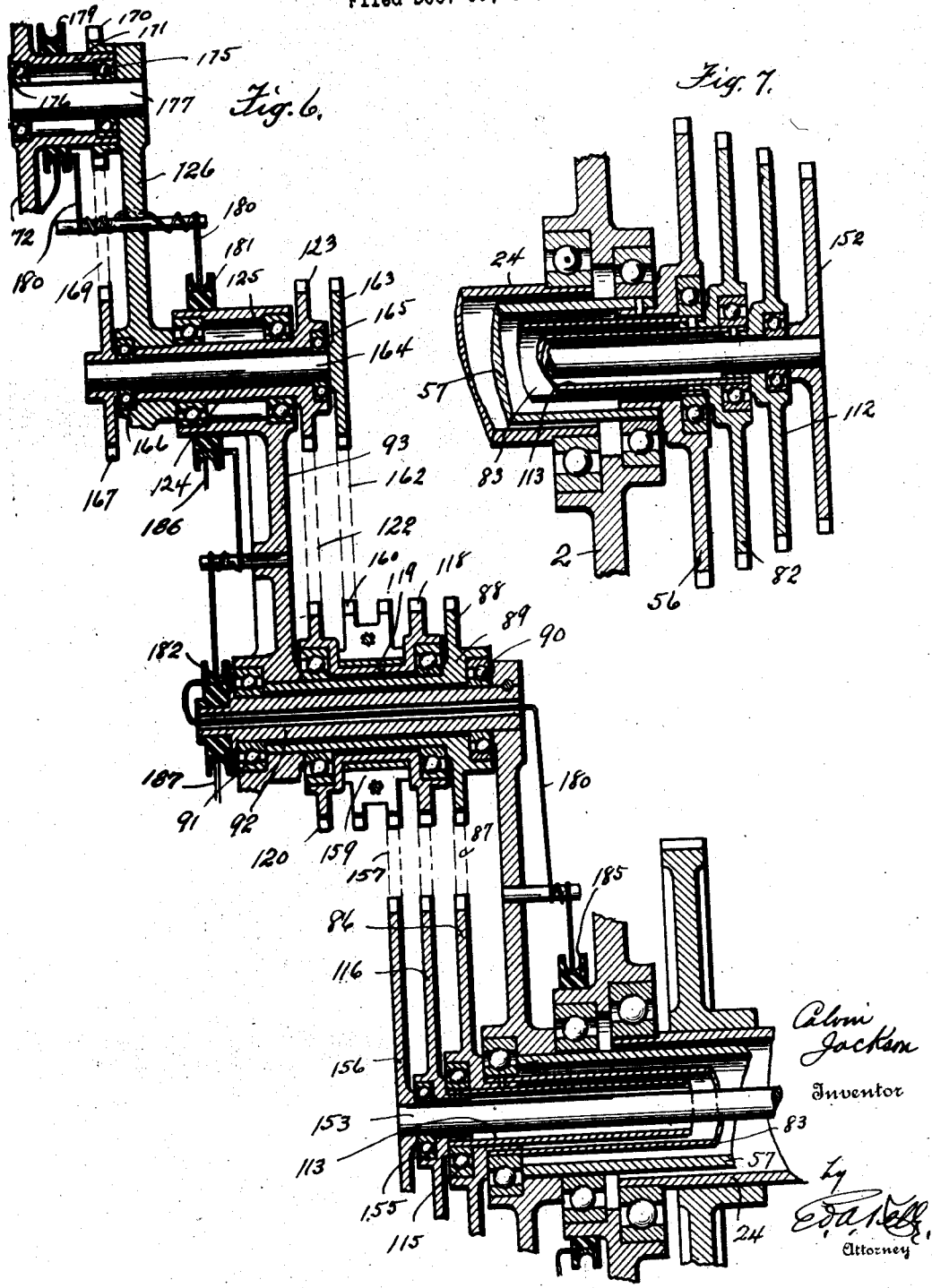

Patented Sept. 15, 1925.

1,553,902

UNITED STATES PATENT OFFICE.

CALVIN JACKSON, OF JACKSONWALD, PENNSYLVANIA, ASSIGNOR OF TWO-THIRDS TO HENRY JOHNSTON, OF READING, PENNSYLVANIA.

DISPLAY DEVICE.

Application filed December 30, 1924. Serial No. 758,808.

*To all whom it may concern:*

Be it known that I, CALVIN JACKSON, a citizen of the United States, residing at Jacksonwald, in the county of Berks and State of Pennsylvania, have invented certain new and useful Improvements in Display Devices, of which the following is a specification.

My invention relates particularly to that class of display apparatus in which a plurality of lamp carrying forms of any desired shape are mounted for rotation or oscillation about their individual relatively spaced axes, while being rotated about a common axis, to produce visionary effects or illusions of a kaleidoscopic nature and thereby attract and retain the attention of the observer, and is especially directed to the mechanism whereby the relative movements of the said lamp-carrying forms may be effected.

The principal objects of my invention are to provide a display apparatus with compact and well balanced actuating mechanism, so correlated that when actuated, an infinitely great variety of illusionary figure effects may be produced.

Other objects of my invention are to provide a display apparatus in which display forms may be given both a rotary and gyratory motion while relatively moving in reverse directions to produce gradually changing visual illusions.

My invention comprehends a display apparatus having a plurality of relatively movable display forms movable in a common plane in a series of compound gyratory paths.

Specifically stated the form of my invention as hereinafter described comprises a plurality of display forms disposed in a common plane and connected through a plurality of concentric shafts to be relatively moved in said plane by the cooperative rotation of a plurality of friction disks disposed in quadrangular relation and cooperative friction rollers restricted to traverse the face of said disks in a linear diametral path in a reciprocatory manner and be connected by gearing to rotate said shafts at relatively different speeds, and thereby so vary the relative movement of said display forms as to produce an infinitely great variety of visual illusions.

Figure 1:
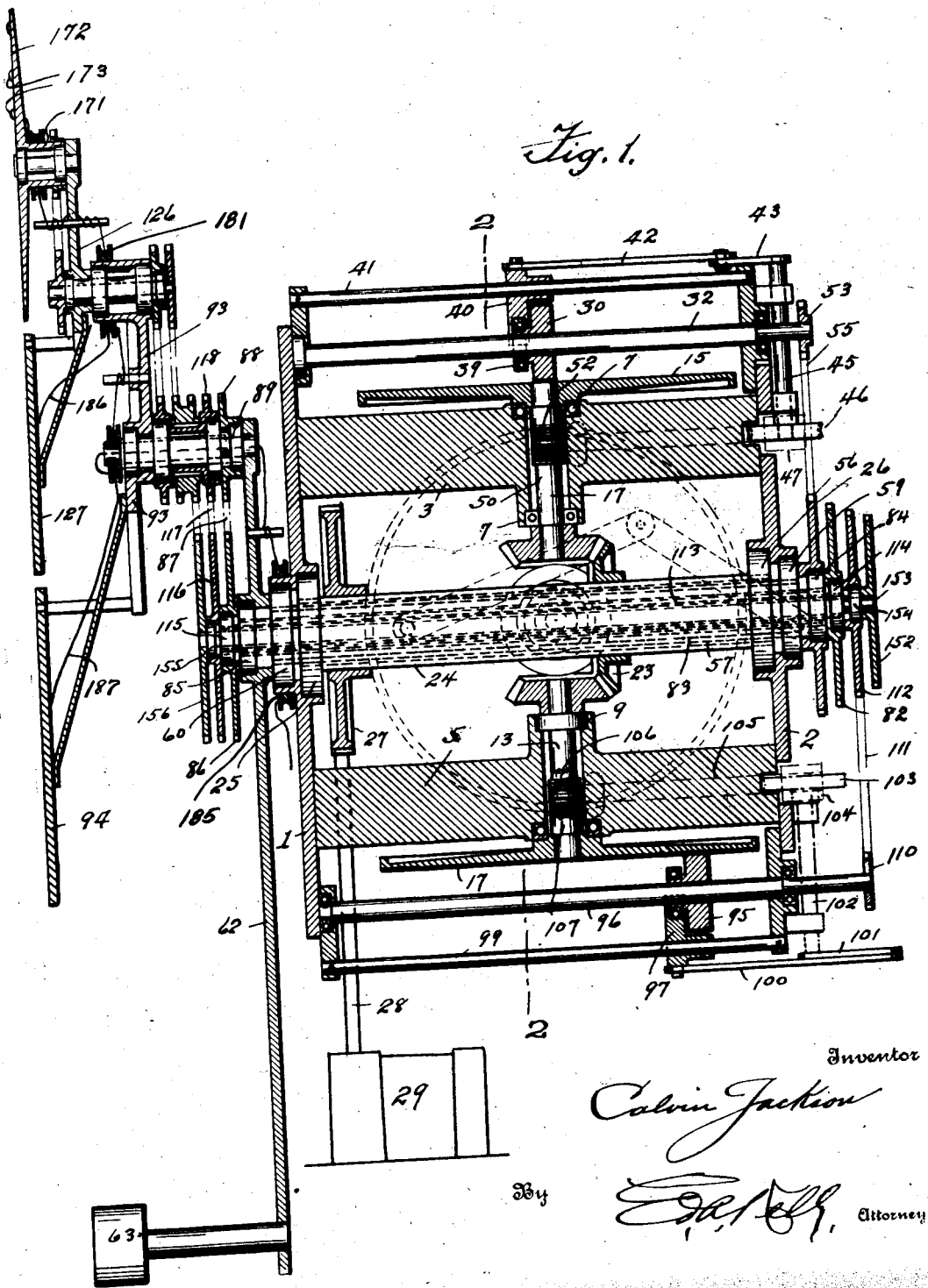
Figure 3:
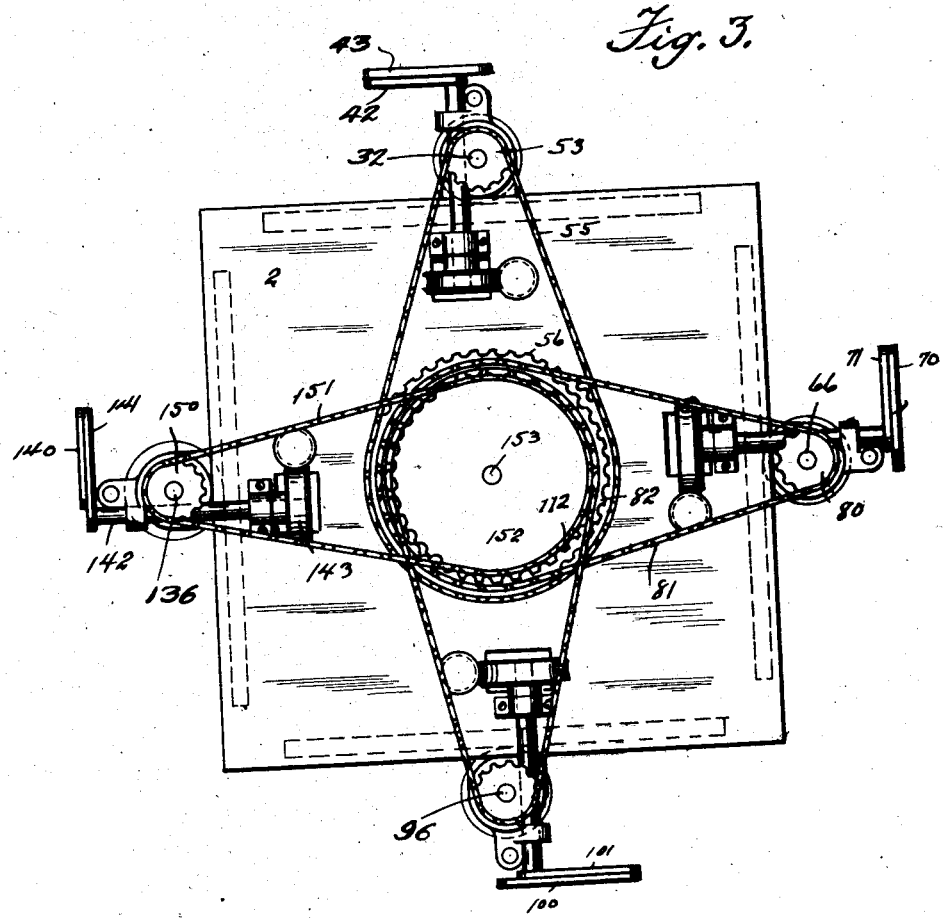
Figure 4:
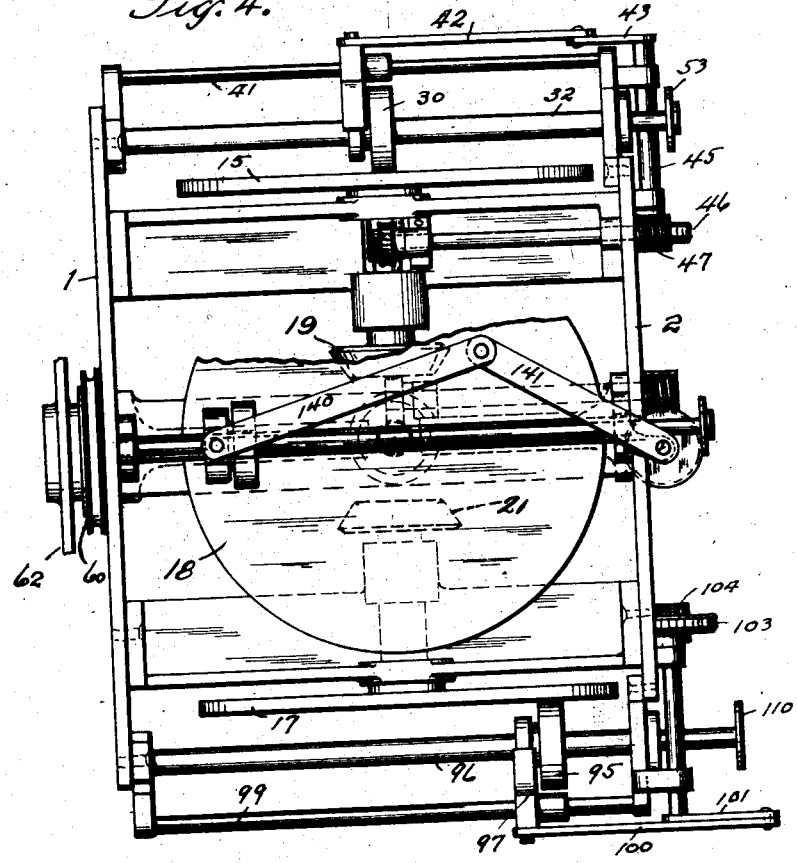

In the accompanying drawings, Figure 1 is a central vertical longitudinal sectional view of an electrical display apparatus constructed in accordance with my invention; Figure 2 is a transverse vertical sectional view of the structure illustrated in Figure 1, taken in a plane on the line 2—2 in said figure normal to its plane of section, certain of the parts being shown in elevation for convenience of illustration; Figure 3 is a rear elevational view of said apparatus, certain parts being omitted for convenience of illustration; Figure 4 is a plan view of said apparatus, certain parts being broken away and other parts omitted for convenience of illustration; Figure 5 is a front or face view of said apparatus, illustrating possible shapes for the light carrying forms; Figure 6 is a fragmentary detail on enlarged scale of the display form mechanism, and Figure 7 is a fragmentary detail view of the inner end of the concentric shafts.

In said figures the frame of the apparatus comprises the front plate 1 and back plate 2 connected by the frame beams 3, 4, 5 and 6 respectively carrying antifriction bearing 7, 8, 9 and 10, for the shafts 11, 12, 13 and 14, which carry at their outer ends, the friction disks or wheels 15, 16, 17 and 18 disposed in quadrangular relation, and at their inner ends, the bevel-gears 19, 20, 21 and 22.

As best shown in Figs. 1 and 2 the bevel gears 19, 20, 21 and 22 are so disposed that their teeth interengage the teeth of the bevel-gear 23 on the tubular sleeve comprising the main driving shaft 24, which is carried by the anti-friction bearings 25 and 26 in the frame plates 1 and 2 and which has the gear wheel or pulley 27, connected to be driven by the sprocket chain or belt 28 with the motor 29; see Fig. 1.

The friction disk or wheel 15 is cooperative to drive the friction roller 30, which is keyed to slide axially on, and rotate the shaft 32, disposed parallel with the friction surface of said disk, and journalled in the anti-friction bearings 33 and 34, in the brackets 35 and 36 which are extended from the edges of the frame plates 1 and 2.

Said friction roller 30 is connected by the anti-friction bearing 39 with the crosshead 40, which is mounted for reciprocation on the guide rod 41 also carried by said brackets 35 and 36, and which is connected, to be actuated to slide the friction roller 30 diametrically across the face of the friction disk 15, by the connecting rod 42, with the crank-arm 43 on the shaft 45, having the worm gear 50 in mesh with the worm 52 on the shaft 11 of the friction disk 15.

Thus, it will be seen that the rotation of the shaft 11 not only effects the rotation of the friction disk or wheel 15, but also effects a movement of its cooperative friction roller 30 axially upon opposite sides of the axis of rotation of said friction disk 15 whereby a constantly varying speed of rotation of said friction roller is effected, in opposite directions, depending upon which side of the axis of said friction disk 15, said roller 30 may be traveling.

As best shown in Fig. 1, the shaft 32 is provided with the sprocket 53, connected by the sprocket chain 55 with the sprocket 56 of relatively larger diameter, which is mounted on the tubular sleeve comprising the shaft 57 carried by the anti-friction bearings 59 and 60, and extended axially through the main driving shaft 24, and carrying the swinging arm or member 62, upon which the display forms, to be hereinafter described, are supported, and counterbalanced by the weight 63.

The friction disk or wheel 16 is cooperative to drive the friction roller 65, which is keyed to slide axially on, and rotate the shaft 66, suitably journalled in parallel relation to the friction surface of said disk, and said friction roller 65 is connected to be carried diametrically across the face of said disk 16, with the crosshead 67, which is mounted for reciprocation on the guide rod 69.

The reciprocation of the crosshead 67 is effected through the connecting-rod 70, which is connected with the crank-arm 71 on the shaft 72 having the worm gear 73, in mesh with the worm 74 on the shaft 75 which is provided with the worm gear 76 in mesh with the worm 77 on the shaft 12 of the friction disk 16.

As shown in Fig. 3, the shaft 66 is provided with the sprocket 80 connected by the sprocket chain 81 with the sprocket 82 of relatively larger diameter, which, as best shown in Fig. 1, is mounted on the tubular sleeve comprising the shaft 83 carried by anti-friction bearings 84 and 85 in the tubular shaft 57 through which said shaft 83 extends.

The forward end of the shaft 83 is provided with the sprocket 86, connected by the sprocket chain 87 with the sprocket 88, the hub 89 of which, is carried by the anti-friction bearings 90 and 91 on the wrist-pin or stud 92, and said hub 89 has secured thereto, the rotatable display-form-carrying-frame 93, to which the display-form 94, carrying suitably disposed electric lamps or other visible means to produce visual illusions, is rigidly attached.

The friction disk or wheel 17 is cooperative to drive the friction roller 95, which is keyed to slide axially on, and rotate the shaft 96, suitably journaled in parallel relation to the friction surface of said disk 17, and said friction roller is connected to be carried diametrically across the face of the disk 17, with the crosshead 97, which is mounted for reciprocation on the guide rod 99.

The reciprocation of the crosshead 97 is effected through the connecting-rod 100, which is connected with the crank-arm 101 on the shaft 102 having the worm-gear 103 in mesh with the worm 104 on the shaft 105 which is provided with the worm gear 106 in mesh with the worm 107 on the shaft 13 of the friction disk 17.

As shown in Fig. 1, the shaft 96 is provided with the sprocket 110 connected by the sprocket chain 111 with the sprocket 112 of relatively larger diameter, which is mounted on the tubular sleeve comprising the shaft 113 carried by the anti-friction bearings 114 and 115 in the tubular shaft 83 through which said shaft 113 extends.

The forward end of the shaft 113 is provided with the sprocket 116, connected by the sprocket chain 117 with the sprocket 118 whose hub 119 is also provided with the sprocket 120, and said hub is mounted to rotate on anti-friction bearings on the hub 89 of the sprocket 88 above described.

Said sprocket 120 is connected by the sprocket chain 122 with the sprocket 123 whose hub 124 is journaled in suitable anti-friction bearings 125 in the display-form-carrying-frame 93, and said hub 124 has secured thereto, the rotatable display-form 127, carrying suitably disposed electric lamps or other visible means to produce visual illusions, is rigidly attached.

The friction disk or wheel 18 is cooperative to drive the friction roller 135 which is keyed to slide axially on, and rotate the shaft 136 suitably journaled in parallel relation to the friction surface of said disk 18, and said friction roller is connected to be carried diametrically across the face of the disk 18 with the cross-head 137, which is mounted for reciprocation on the guide rod 139.

The reciprocation of the crosshead 137 is effected through the connecting-rod 140, which is connected with the crank-arm 141 on the shaft 142 having the worm-gear 143 in mesh with the worm 144 on the shaft 145 which is provided with the worm-gear 146 in mesh with the worm 147 on the shaft 14 of the friction-disk 18.

As shown in Fig. 3, the shaft 136 is provided with the sprocket 150 connected by the sprocket chain 151 with the sprocket 152 of relatively larger diameter, which as better shown in Fig. 1, is mounted on the shaft 153 carried by the anti-friction bearings 154 and 155 in the tubular shaft 113 through which said shaft 153 extends.

The forward end of the shaft 153 is provided with the sprocket 156, connected by the sprocket chain 157 with the sprocket 158 whose hub 159 is mounted to rotate on the hub 119, and is also provided with the sprocket 160.

Said sprocket 160 is connected by the sprocket-chain 162 with the sprocket 163 mounted on the shaft 164 which is journaled in the anti-friction bearings 165 and 166 in the hub 124, and said shaft also carries at its forward end the sprocket 167 connected by the sprocket chain 169 with the sprocket 170 which is mounted on the hub 171 of the display-form 172 carrying suitably disposed electric lamps 173 or other visible means to produce visual illusions.

The hub 171 is journaled on the anti-friction bearings 175 and 176 which are carried on the stud shaft or wrist pin 177, projecting forwardly from the display-form-carrying-frame 126, and said hub carries the electric contact ring 179 through which electric current to light the lamps 173 is supplied by the electrical conductor 180, which also contacts with the contact-ring 181 on the frame 93, the contact ring 182 on the wrist-pin 92 through which said electrical conductor extends, and the contact ring 185 on the frame plate 1, from which it extends to the source of electric current supply. The contact ring 181 collects electric current which is supplied to the display form 127 through the lead 186, and contact ring 182 collects electric current which is supplied to the display form 94 through the lead 187.

It may be here noted that as shown in Fig. 2 the worm gears 50, 76, 106 and 146 are not multiples of each other, but are of relatively different diameters which effects a constantly changing relative motion of the display forms and consequently produces an infinitely great variety of form combinations to produce visual illusions which are not duplicated during a great many revolutions of the friction disks.

I do not desire to limit my invention to the precise details of construction and arrangement as herein set forth, as it is obvious that various modifications may be made therein, without departing from the essential features of my invention as defined in the appended claims.

Having thus described my invention, I claim:

1. A display apparatus comprising a drive shaft, a plurality of friction disk wheels rectangularly arranged about the axis of said drive shaft, means operatively connecting said disk wheels with said shaft, a friction roller engaged with each of said disk wheels and arranged to be shifted lineally to tangentially engage the face of said disk wheel along a diametral path, a plurality of relatively rotatable members including display forms carrying means arranged to effect visual illusions, rotatable on axes arranged to gyrate about a common axis, and gearing means operatively connecting said rotatable members with said friction rollers to effect the rotation of said members at relatively different speeds, whereby an infinitely great number of combinations of relatively different positions of said display forms may be attained.

2. A display apparatus comprising a drive shaft, a plurality of friction disks connected to be rotated by said shaft, and so disposed about the axis of said shaft as to conform to a polygonal figure, a counter shaft disposed parallel with the face of each of said disks in the plane of its diameter, a friction roller keyed to slide axially on each of said counter shafts in frictional engagement with the face of its respective disk, means actuated by the rotation of said rollers to effect their axial reciprocation on said counter shafts and thereby slide them diametrically across the face of said disks, a plurality of relatively rotatable members including display forms carrying means arranged to effect visual illusions, rotatable on axes arranged to gyrate about a common axis, and gearing means operatively connecting said rotatable members with said counter shafts to effect their rotation.

In testimony whereof I affix my signature.

CALVIN JACKSON.